(12) United States Patent
Chuck et al.

(10) Patent No.: US 10,723,054 B2
(45) Date of Patent: Jul. 28, 2020

(54) MOLDING INSERT ASSEMBLY, MOLDING APPARATUS, AND MOLDING METHOD

(71) Applicant: The Boeing Company, Chicago, IL (US)

(72) Inventors: Chen Chuck, Mercer Island, WA (US); Everette D. Gray, Seattle, WA (US); David J. Barene, Arlington, WA (US); Tunde A. Olaniyan, Bothell, WA (US); Zachariah B. Vandemark, Seattle, WA (US)

(73) Assignee: The Boeing Company, Chicago, IL (US)

( * ) Notice: Subject to any disclaimer, the term of this patent is extended or adjusted under 35 U.S.C. 154(b) by 401 days.

(21) Appl. No.: 15/837,604

(22) Filed: Dec. 11, 2017

(65) Prior Publication Data
US 2019/0176382 A1    Jun. 13, 2019

(51) Int. Cl.
| | |
|---|---|
| *B29C 45/44* | (2006.01) |
| *B29C 45/26* | (2006.01) |
| *B29L 31/00* | (2006.01) |
| *F02K 1/62* | (2006.01) |
| *B29C 33/48* | (2006.01) |
| *B29C 33/12* | (2006.01) |
| *B29C 70/06* | (2006.01) |

(Continued)

(52) U.S. Cl.
CPC .......... *B29C 45/44* (2013.01); *B29C 45/2628* (2013.01); *B29C 33/12* (2013.01); *B29C 33/305* (2013.01); *B29C 33/44* (2013.01); *B29C 33/48* (2013.01); *B29C 33/485* (2013.01); *B29C 45/2624* (2013.01); *B29C 70/06* (2013.01); *B29L 2031/7504* (2013.01); *F02K 1/625* (2013.01); *F02K 1/64* (2013.01); *F02K 1/70* (2013.01); *F02K 1/72* (2013.01)

(58) Field of Classification Search
CPC . B29L 2031/7504; B29C 70/06; B29C 45/44; B29C 45/2628; B29C 45/2624; B29C 33/485; B29C 33/48; B29C 33/44; B29C 33/305; B29C 33/12; F02K 1/64; F02K 1/70; F02K 1/72; F02K 1/625
USPC ....................................................... 264/318
See application file for complete search history.

(56) References Cited

U.S. PATENT DOCUMENTS

| | | |
|---|---|---|
| 4,596,621 A | 6/1986 | Nawaz |
| 5,576,079 A | 11/1996 | Forman et al. |

(Continued)

FOREIGN PATENT DOCUMENTS

WO    2018169453 A2    9/2018

*Primary Examiner* — Joseph S Del Sole
*Assistant Examiner* — Lawrence D. Hohenbrink, Jr.
(74) *Attorney, Agent, or Firm* — Coats + Bennett, PLLC

(57) ABSTRACT

Methods of fabricating a component, such as a cascade grid panel for a jet engine thrust reverser, having a plurality of cavities extending through the component, with each cavity having at least one surface with a complex contour, and related devices. A plurality of two or more mold inserts are stacked to form a mold insert stack, with the mold insert stack having a plurality of mold bosses formed by mold boss sets. The mold boss sets are each formed by a mold boss segment from each of the mold inserts. Further, the mold boss segments are affixed to respective baseplates so that the mold boss segments can be handled as a group and remain properly positioned relative to their neighboring mold boss segments.

20 Claims, 18 Drawing Sheets

(51) Int. Cl.
   *F02K 1/70* (2006.01)
   *F02K 1/72* (2006.01)
   *B29C 33/30* (2006.01)
   *B29C 33/44* (2006.01)
   *F02K 1/64* (2006.01)

(56) References Cited

U.S. PATENT DOCUMENTS

| | | | |
|---|---|---|---|
| 2016/0186689 A1* | 6/2016 | Bartel | F02K 1/72 |
| | | | 239/265.19 |
| 2016/0263820 A1* | 9/2016 | Kruckenberg | B29C 66/301 |
| 2018/0117814 A1* | 5/2018 | Yamada | B29C 45/33 |
| 2018/0133924 A1* | 5/2018 | Gray | B28B 7/0038 |

* cited by examiner

MOLDING INSERT ASSEMBLY, MOLDING APPARATUS, AND MOLDING METHOD

TECHNOLOGICAL FIELD

The present disclosure relates generally to the field of component manufacturing, and more specifically to devices and methods for fabricating a component having a plurality of cavities extending through the component, with each cavity having at least one surface with a complex contour.

BACKGROUND

Components may be fabricated using a variety of techniques. One common technique is molding. Molding is a manufacturing process using malleable raw material. To mold a part, the raw material is introduced into a mold cavity. The raw material moves in the mold to contact the walls of the mold cavity, with the shape of the mold cavity corresponding to the shape for the molded component.

The mold cavity is created by a plurality of mold portions, such as upper and lower (or left and right) mold portions. To remove the molded component from the mold cavity, the mold portions are moved away from each other to open the mold. Mold inserts may be added in the mold cavity to form details in the part. Mold inserts are commonly used to form surface structures, channels, cavities, or other features. However, some features are difficult to form using mold inserts. For example, some cavities with complex contours may trap mold inserts due to the presence of negative draft angles on some surfaces. While some approaches to forming cavities with complex contours have been developed, there remains a need for alternative approaches. As such, it is desirable to have additional devices and methods that facilitate fabricating components that have a plurality of cavities extending through the component, advantageously including components where some or all of the cavities have at least one surface with a complex contour, as well as other possible issues.

SUMMARY

Aspects of the present disclosure are directed to a mold insert assembly for fabricating a component, the component having a plurality of cavities, each cavity having at least one surface with a complex contour. The mold insert assembly includes a first mold insert and a second mold insert that are stacked. The first mold insert has a first baseplate and a plurality of first mold boss segments protruding from the first baseplate in spaced relation to each other. The second mold insert has a second baseplate and a plurality of second mold boss segments protruding from the second baseplate in spaced relation to each other; the second mold insert further having a plurality of second apertures in the second baseplate disposed in spaced relation to each other. The first and second mold inserts are stacked such that the second baseplate overlaps the first baseplate and each of the first mold boss segments extends through a corresponding second aperture and abuts a corresponding second mold boss segment. The first and second mold inserts jointly form mold boss sets, wherein each mold boss set comprises a first mold boss segment and the abutting second mold boss segment. Each mold boss set forms a cavity-fill structure configured to at least partly fill a corresponding cavity of the plurality of cavities of the component. The first and second mold boss segments are configured to be removable from their corresponding cavities, after molding of the component, while remaining retained with their respective baseplates.

In some aspects, the mold insert assembly also includes a third mold insert. The third mold insert has a third baseplate and a plurality of third mold boss segments protruding from the third baseplate in spaced relation to each other. The third mold insert further has a plurality of third apertures in the third baseplate disposed in spaced relation to each other. For such aspects, the first, second, and third mold inserts are stacked such that the third baseplate overlaps the second baseplate such that the second baseplate is sandwiched between the first baseplate and the third baseplate. The first and second mold boss segments extend through corresponding ones of the third apertures. For such aspects, each mold boss set further includes a third mold boss segment that abuts either or both of the first mold boss segment and the second mold boss segment of that mold boss set.

Other aspects of the disclosure are directed to a molding apparatus. The molding apparatus is configured for fabricating a component, the component having a plurality of cavities, each cavity having at least one surface with a complex contour. The molding apparatus includes a mold cavity formed by a first mold portion and second mold portion that are movable relative to each other. The molding apparatus also includes a molding insert of the aspects discussed above, and detailed further below. In some aspects, the molding apparatus is advantageously configured to sequentially mold multiple cascade grid panels for a jet engine thrust reverser using the same mold inserts while retaining the mold boss segments of the first and second mold inserts with their respective baseplates.

Further aspects of the disclosure are directed to a method of fabricating a component, the component having a plurality of cavities extending through the component, each cavity having at least one surface with a complex contour. One example of such a component is a cascade grid panel for a jet engine thrust reverser, but there are other such components as well. The method includes providing a first mold insert having a first baseplate and a plurality of first mold boss segments protruding from the first baseplate in spaced relation to each other. The method also includes, providing a second mold insert having a second baseplate and a plurality of second mold boss segments protruding from the second baseplate in spaced relation to each other. The method further includes molding the component while each cavity of the plurality of cavities is at least partly filled by both a first mold boss segment from the first mold insert and a second mold boss segment from the second mold insert, and while the first and second mold inserts are stacked such that the second baseplate overlaps the first baseplate with the first mold boss segments from the first mold insert extending through the second baseplate of the second mold insert. The method continues with thereafter, separating the first and second mold inserts from the molded component while retaining the mold boss segments of the first and second mold inserts with their respective baseplates. Each cavity of the plurality of cavities has at least one surface with a negative draft angle with respect to the first and second baseplates.

In some aspects, the separating the mold inserts from the molded component comprises sequentially separating the first mold insert and the second mold insert by a) moving the first baseplate away from the molded component while retaining the first mold boss segments with the first baseplate; and b) thereafter, moving the second baseplate away from the molded component while retaining the second mold boss segments with the second baseplate.

In some aspects, the method includes, after the separating, fabricating another component using both the first mold insert and the second mold insert, while retaining the mold boss segments of the first and second mold inserts with their respective baseplates.

In some aspects, the method also includes providing a third mold insert having a third baseplate and a plurality of third mold boss segments protruding from the third baseplate in spaced relation to each other. For such aspects, the molding the component comprises molding the component while the first, second, and third mold inserts are stacked such that the third baseplate overlaps the first and second baseplates with the first and second mold boss segments from the first and second mold inserts, respectively, extend through the third baseplate of the third mold insert. And, for such aspects, the separating the mold inserts from the molded component comprises separating the mold inserts from the molded component while retaining the third mold boss segments with the third baseplate.

The features, functions and advantages that have been discussed can be achieved independently in various aspects or may be combined in yet other aspects further details of which can be seen with reference to the following description and the drawings.

BRIEF DESCRIPTION OF THE DRAWINGS

Having thus described variations of the disclosure in general terms, reference will now be made to the accompanying drawings, which are not necessarily drawn to scale.

Figure 1:
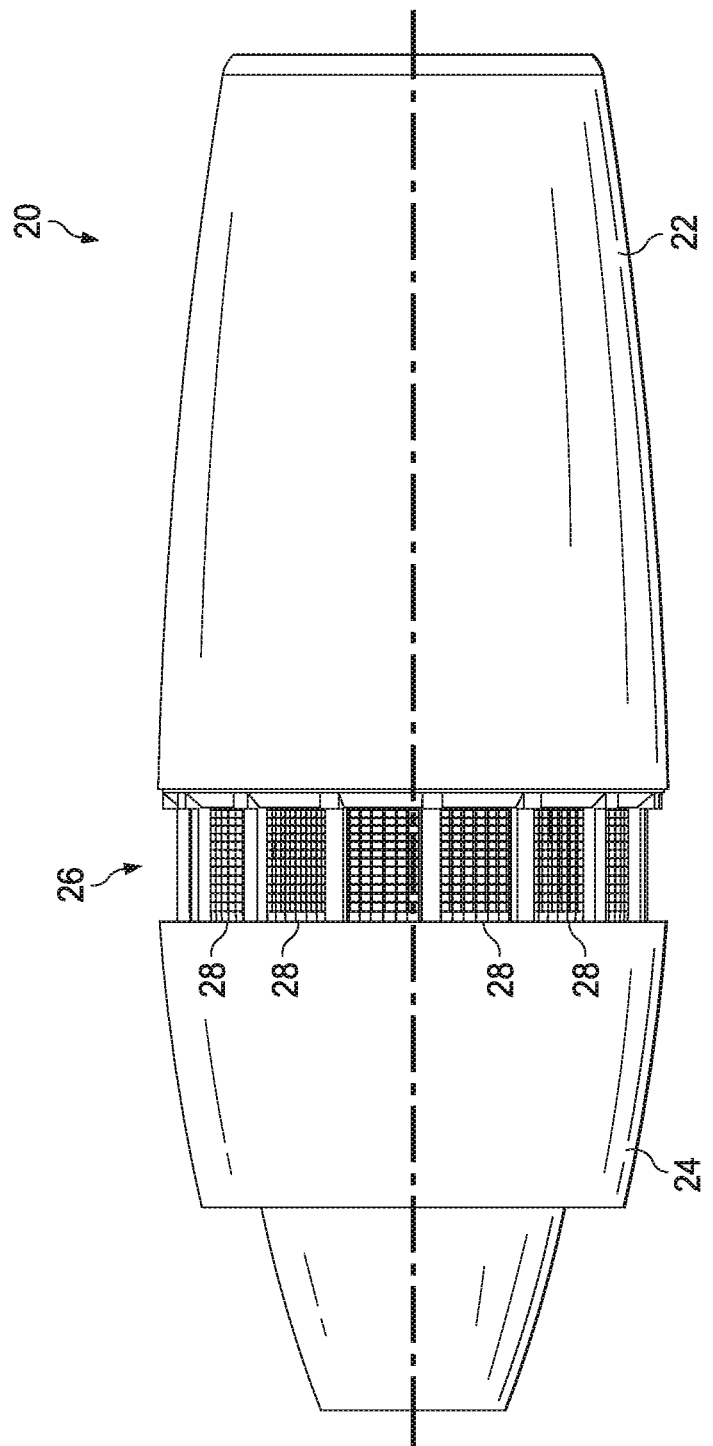

FIG. 1 shows a side elevational view of an airplane jet engine, with a transcowl shifted rearwardly to expose a cascade-type thrust reverser.

Figure 2:
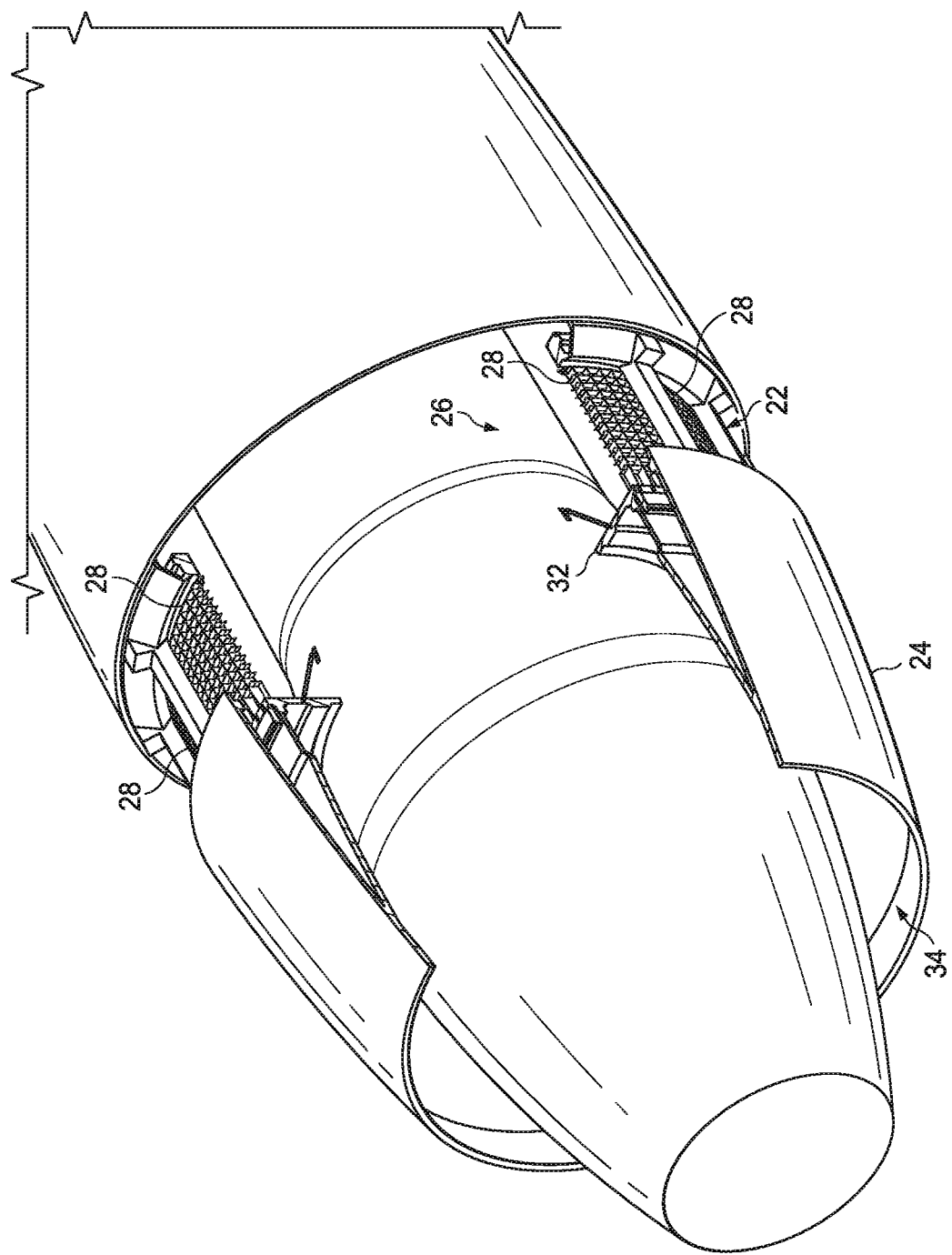

FIG. 2 shows a perspective view of the aft end of the jet engine shown in FIG. 1.

Figure 3:
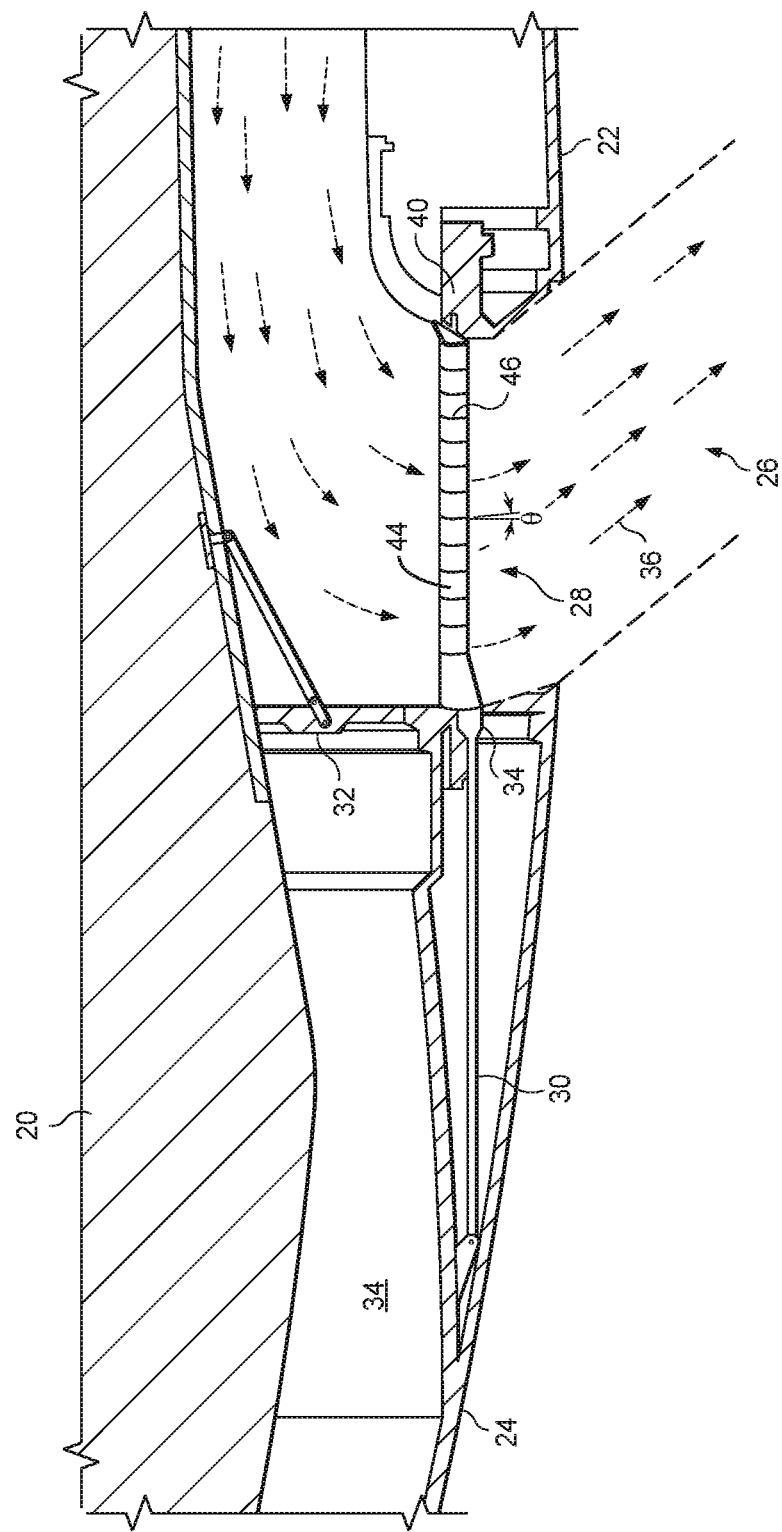

FIG. 3 shows a longitudinal sectional view of a portion of the jet engine shown in FIGS. 1 and 2, illustrating airflow through the thrust reverser.

Figure 4:
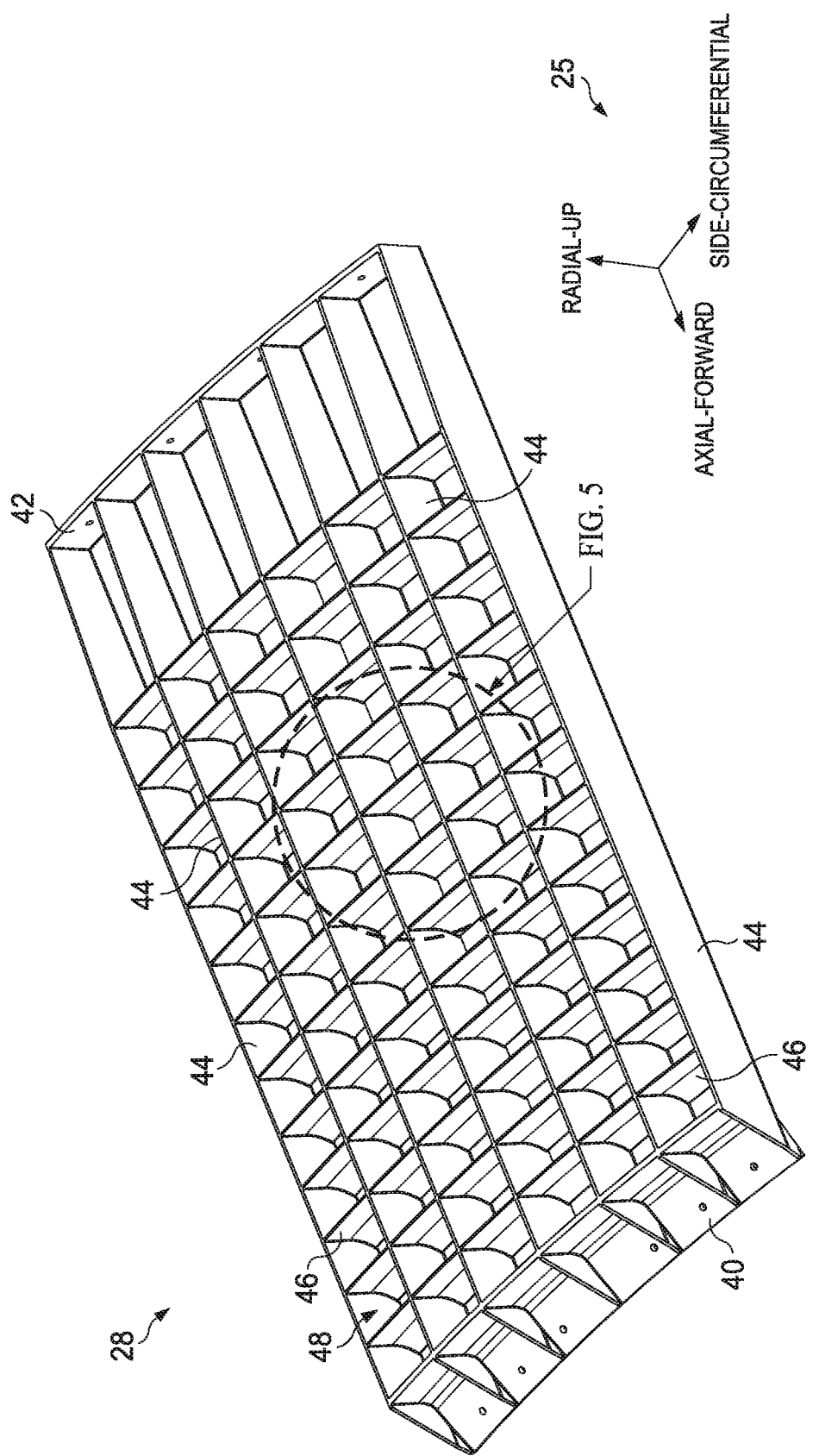

FIG. 4 shows a top, perspective view of a cascade grid panel forming part of the thrust reverser.

Figure 5:
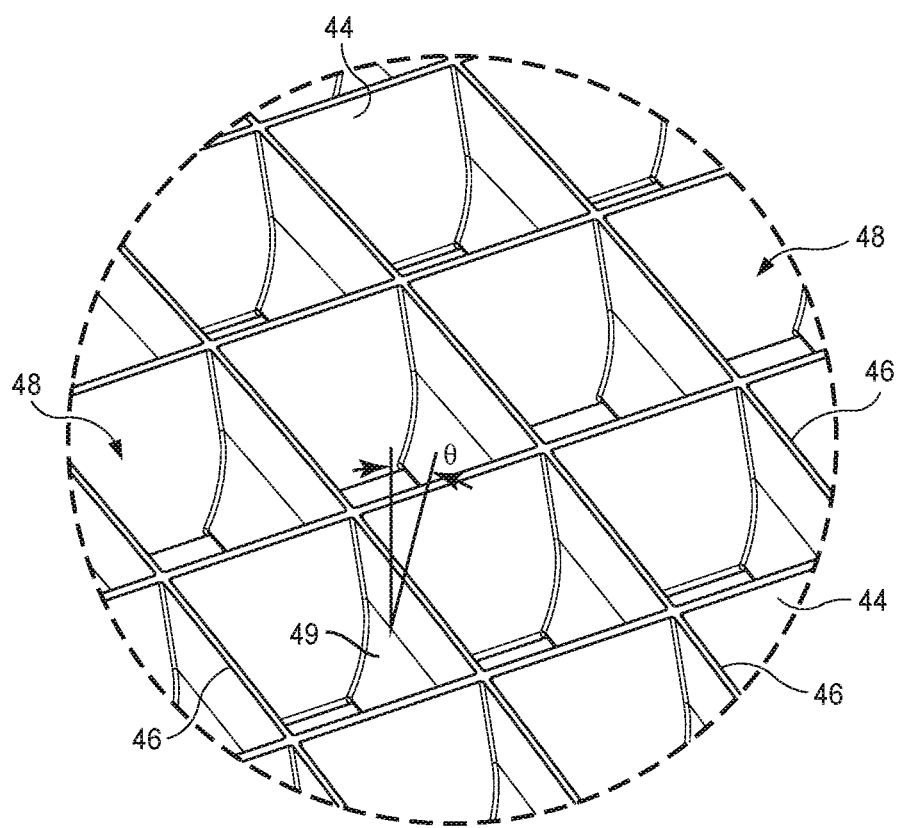

FIG. 5 shows the area designated as FIG. 5 in FIG. 4.

Figure 6:
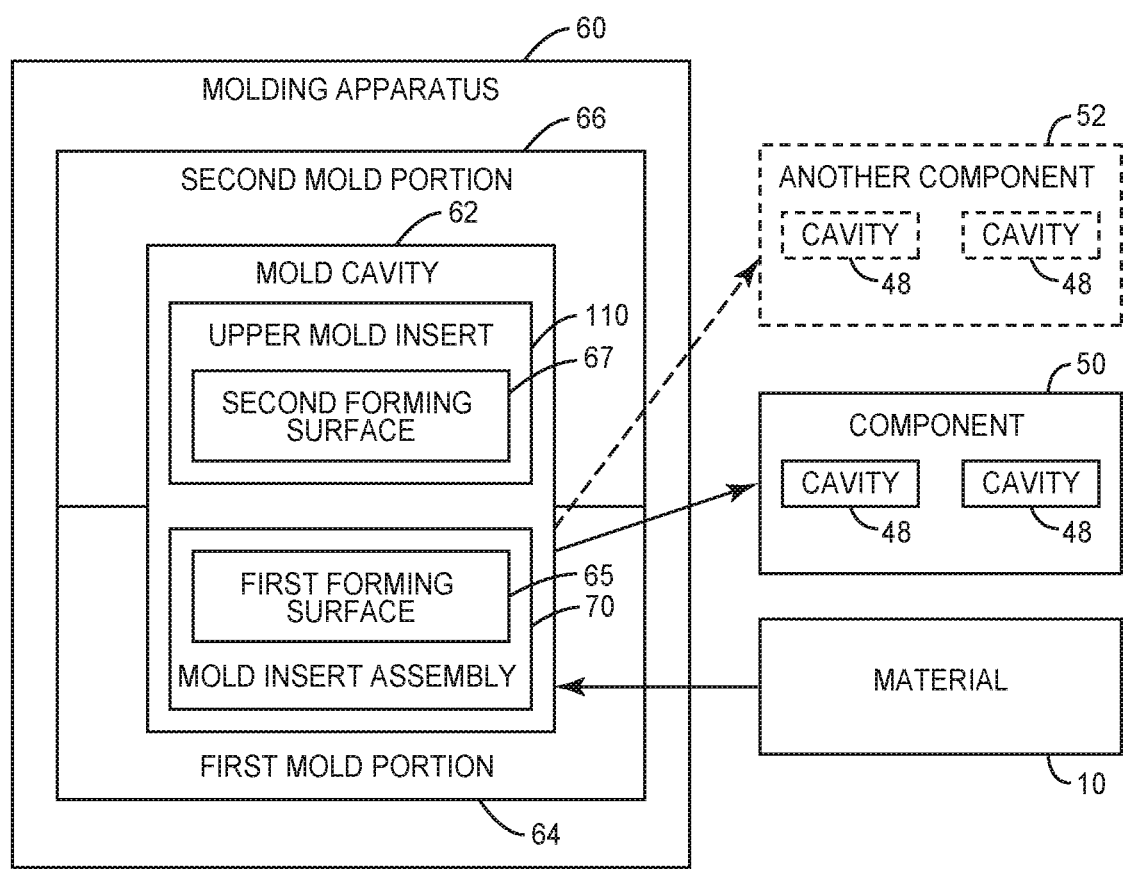

FIG. 6 shows a block diagram of a molding apparatus of aspects of the present disclosure.

Figure 7:
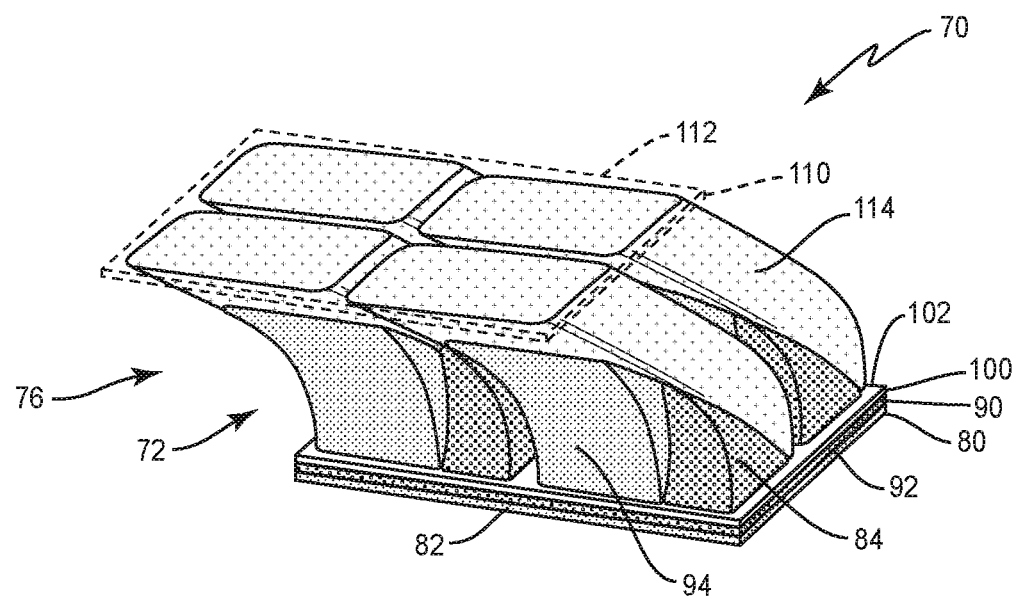

FIG. 7 shows a perspective view of a molding insert assembly of aspects of the present disclosure.

Figure 7A:
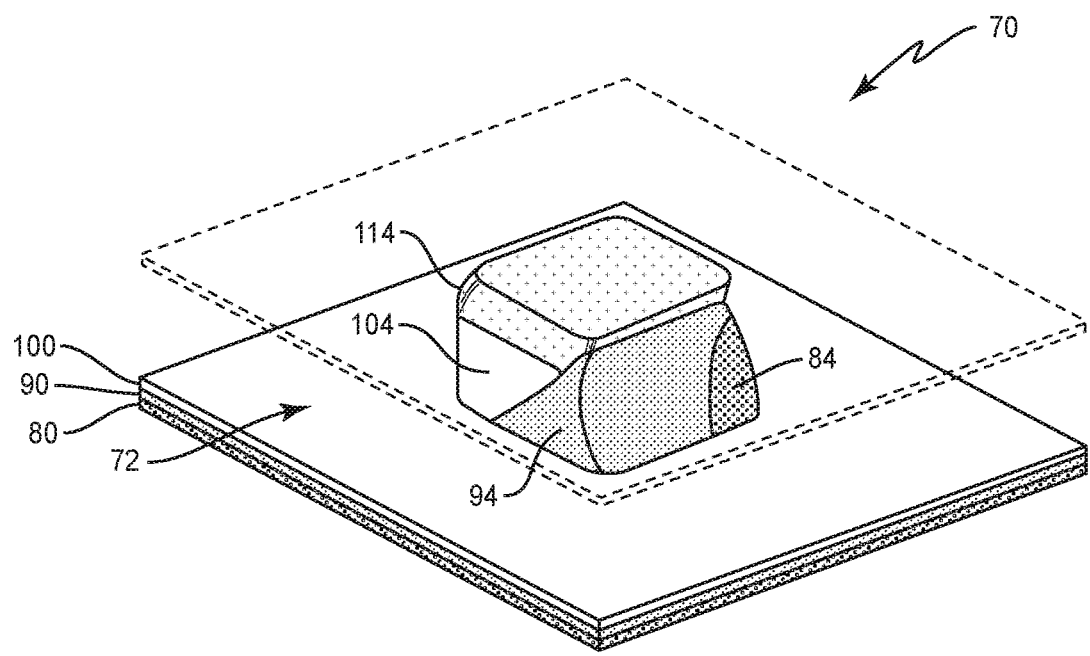

FIG. 7A shows an isolated mold boss set from FIG. 7.

Figure 8:
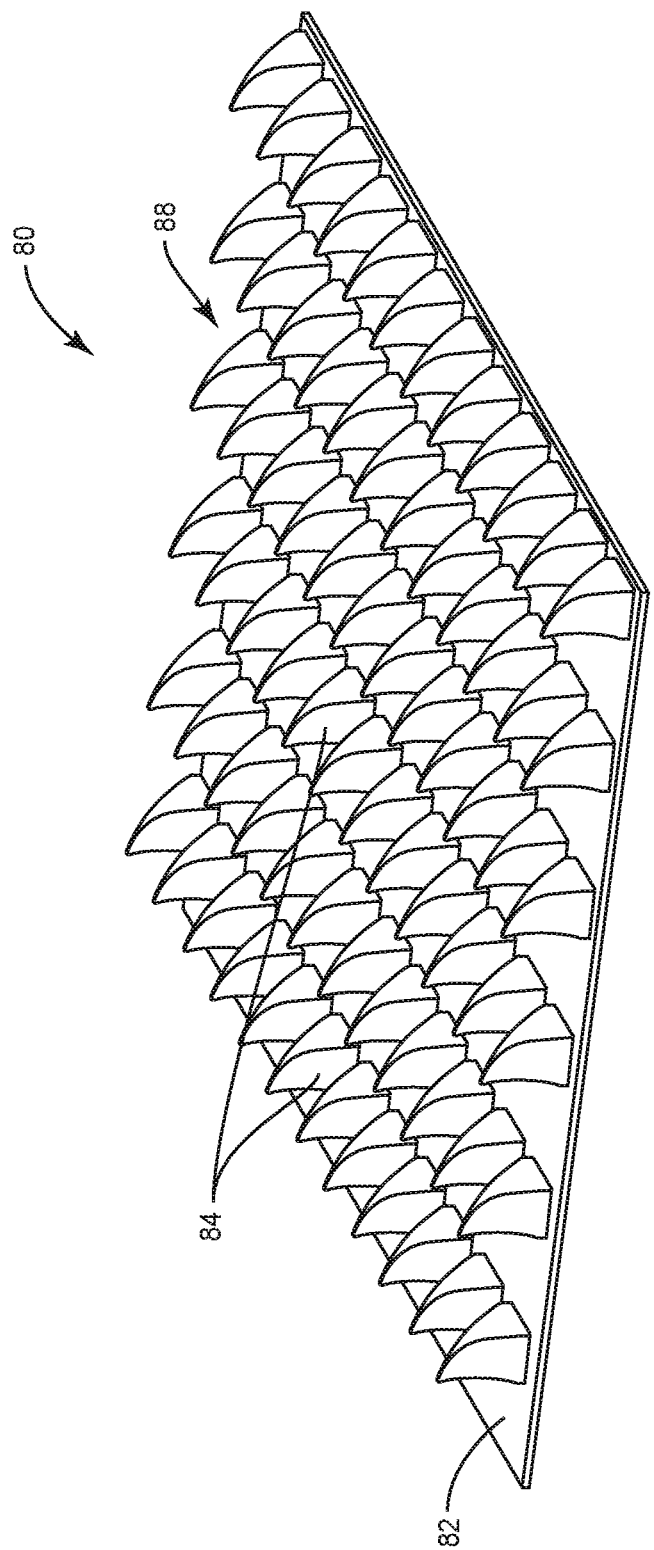

FIG. 8 shows a perspective view of a first mold insert of aspects of the present disclosure.

Figure 9:
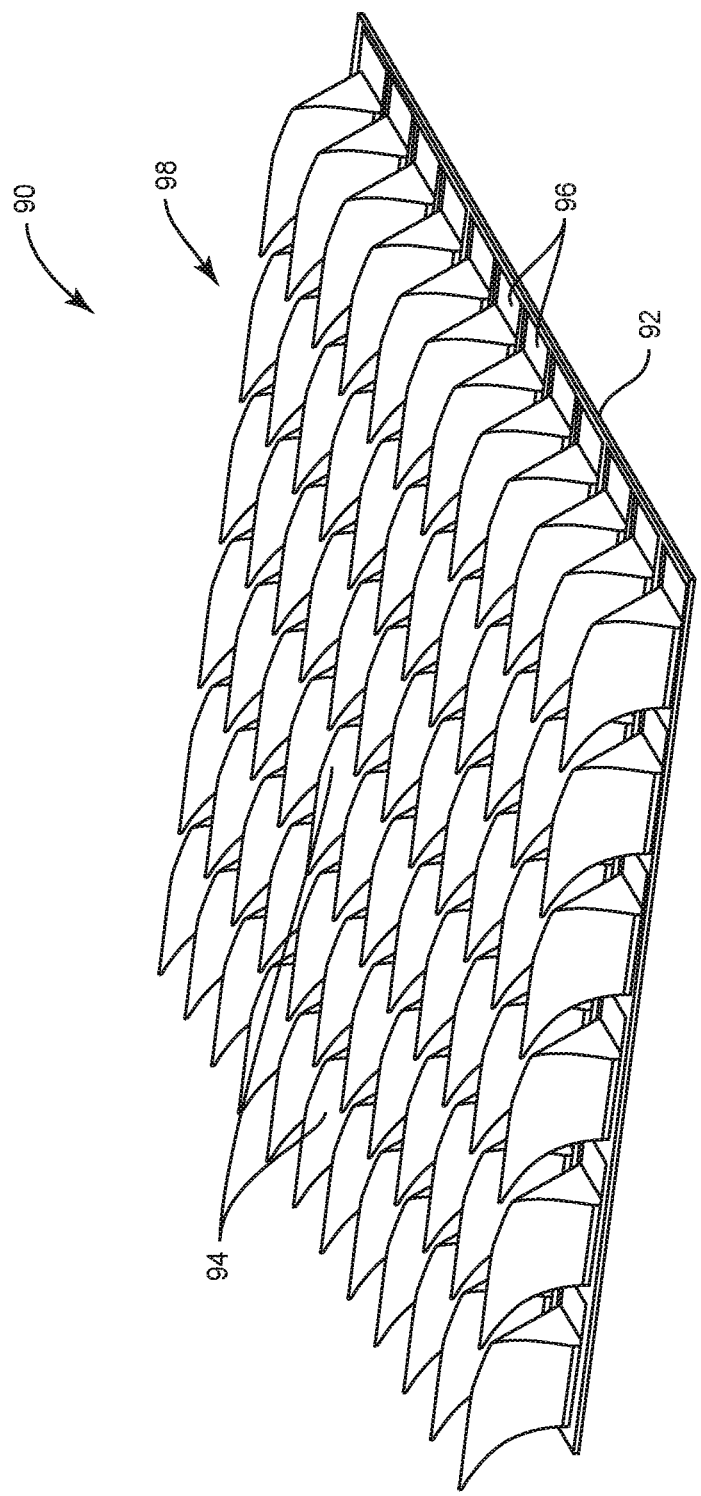

FIG. 9 shows a perspective view of a second mold insert of aspects of the present disclosure.

Figure 10:
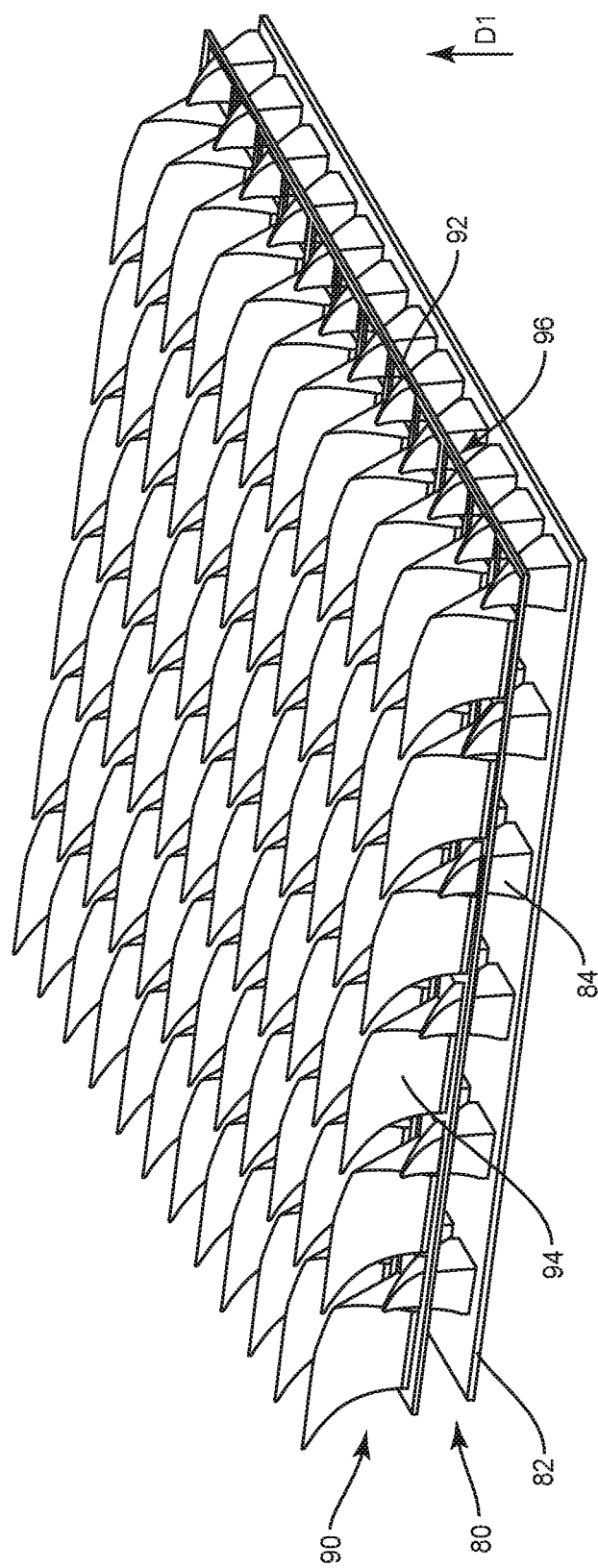

FIG. 10 shows a perspective view of the first mold insert of FIG. 8 being stacked with the second mold insert of FIG. 9.

Figure 11:
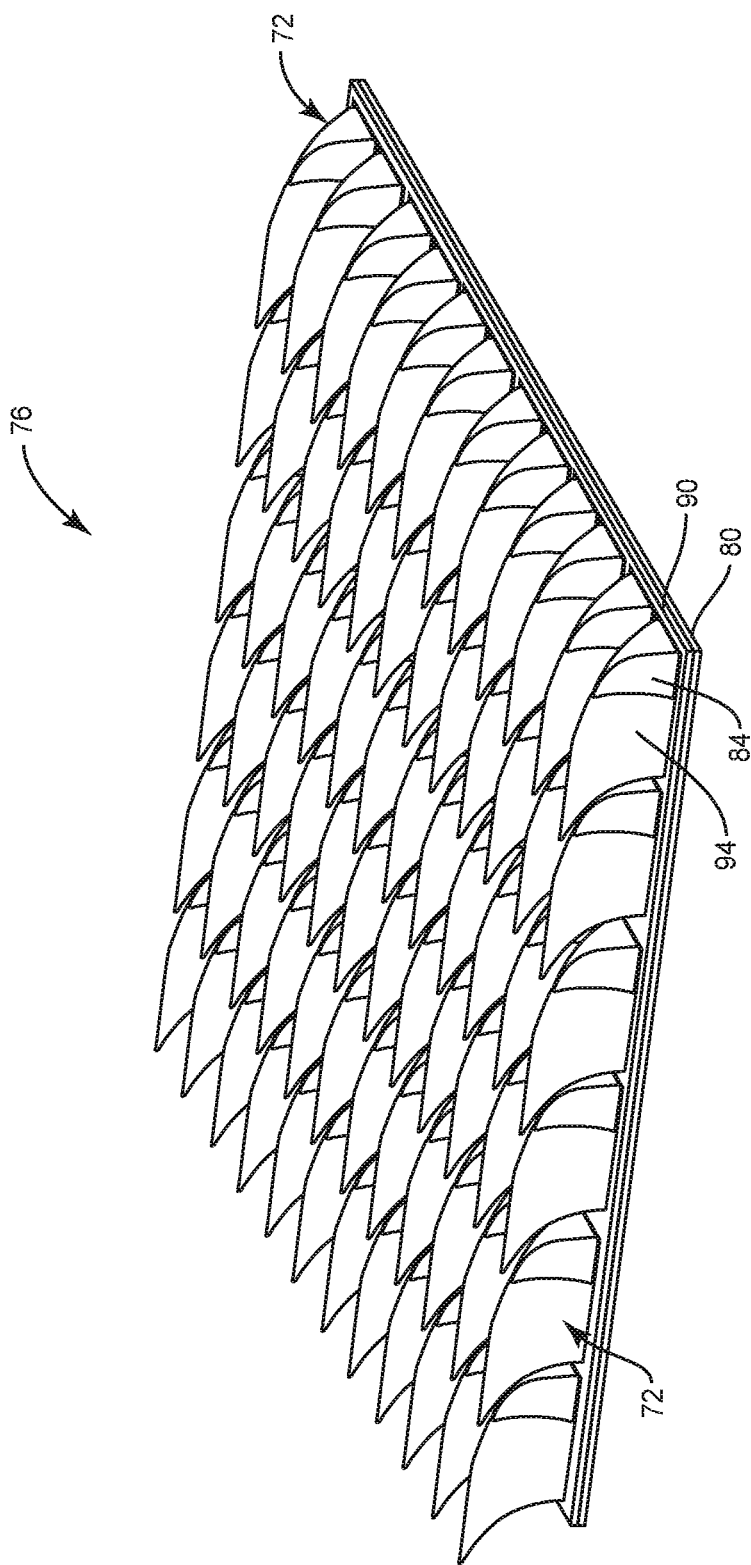

FIG. 11 shows a perspective view of the first mold insert of FIG. 8 joined with the second mold insert of FIG. 9 to form a mold insert assembly.

Figure 12:
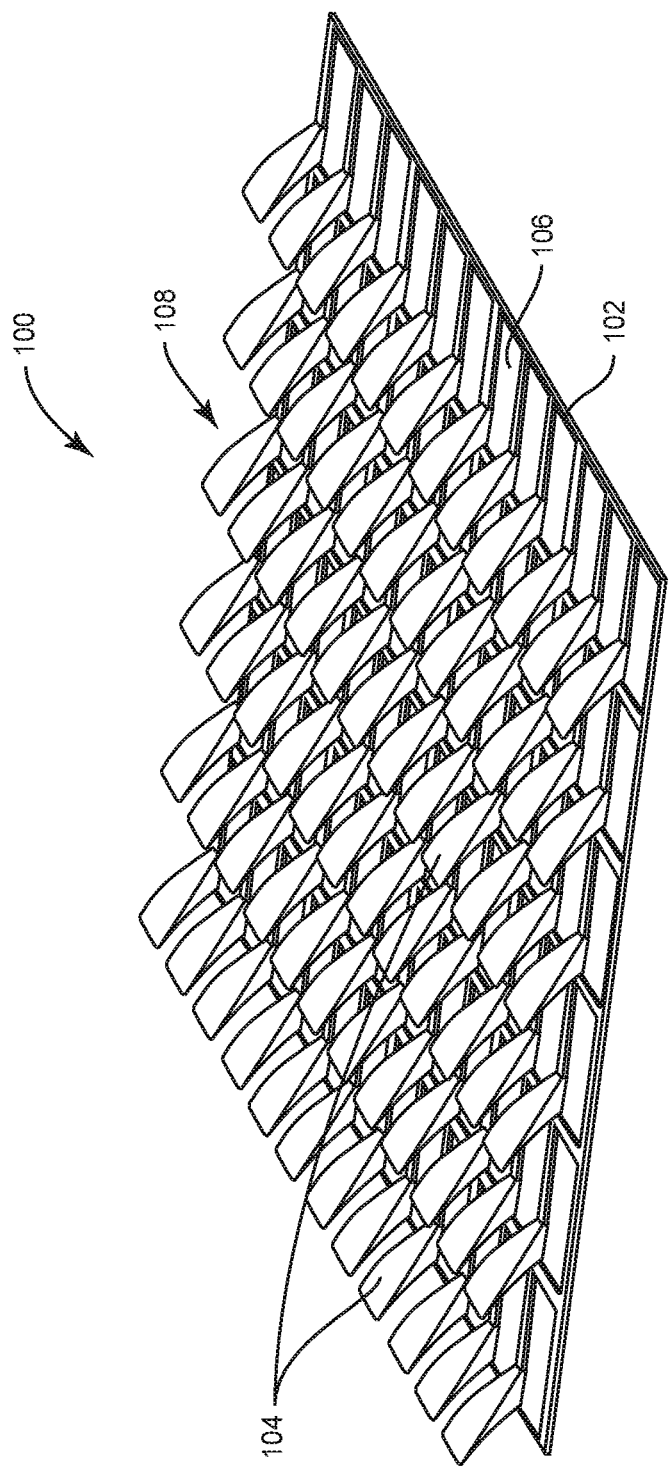

FIG. 12 shows a perspective view of a third mold insert of aspects of the present disclosure.

Figure 13:
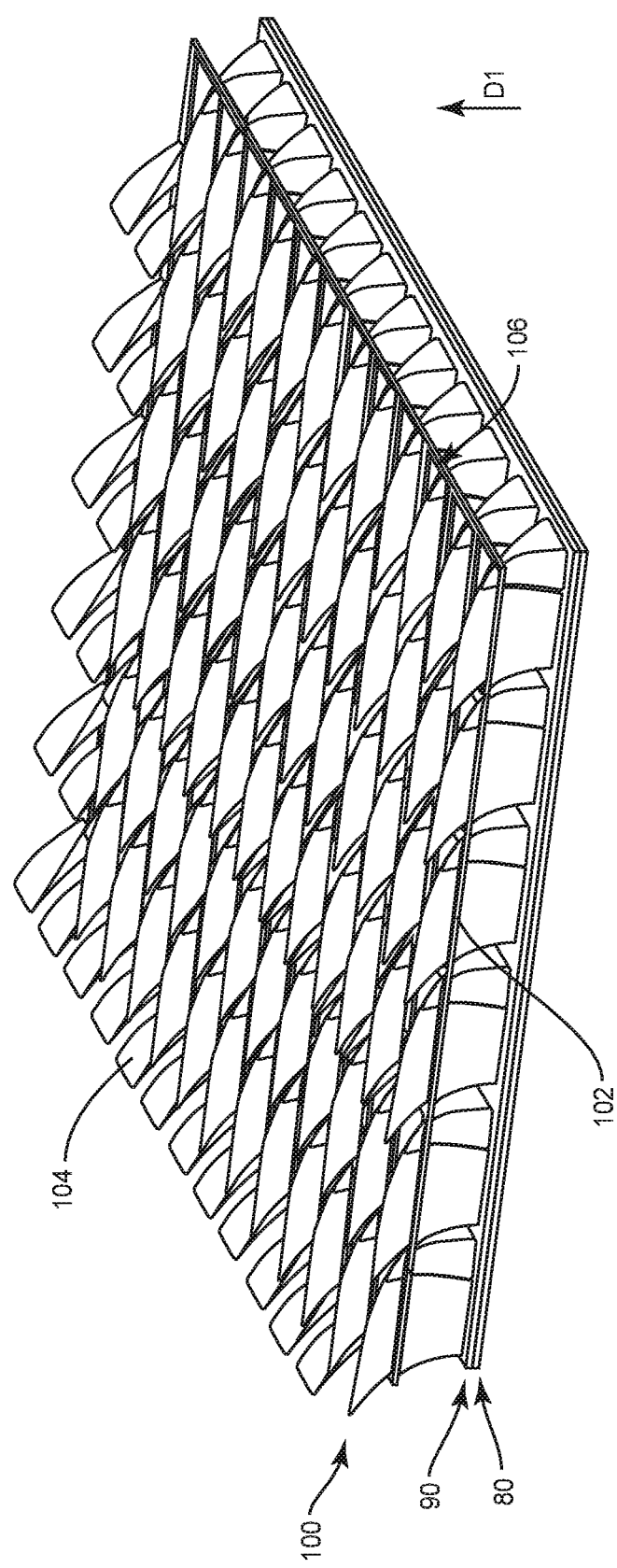

FIG. 13 shows a perspective view of a third mold insert being stacked with a first and second mold insert.

Figure 14:
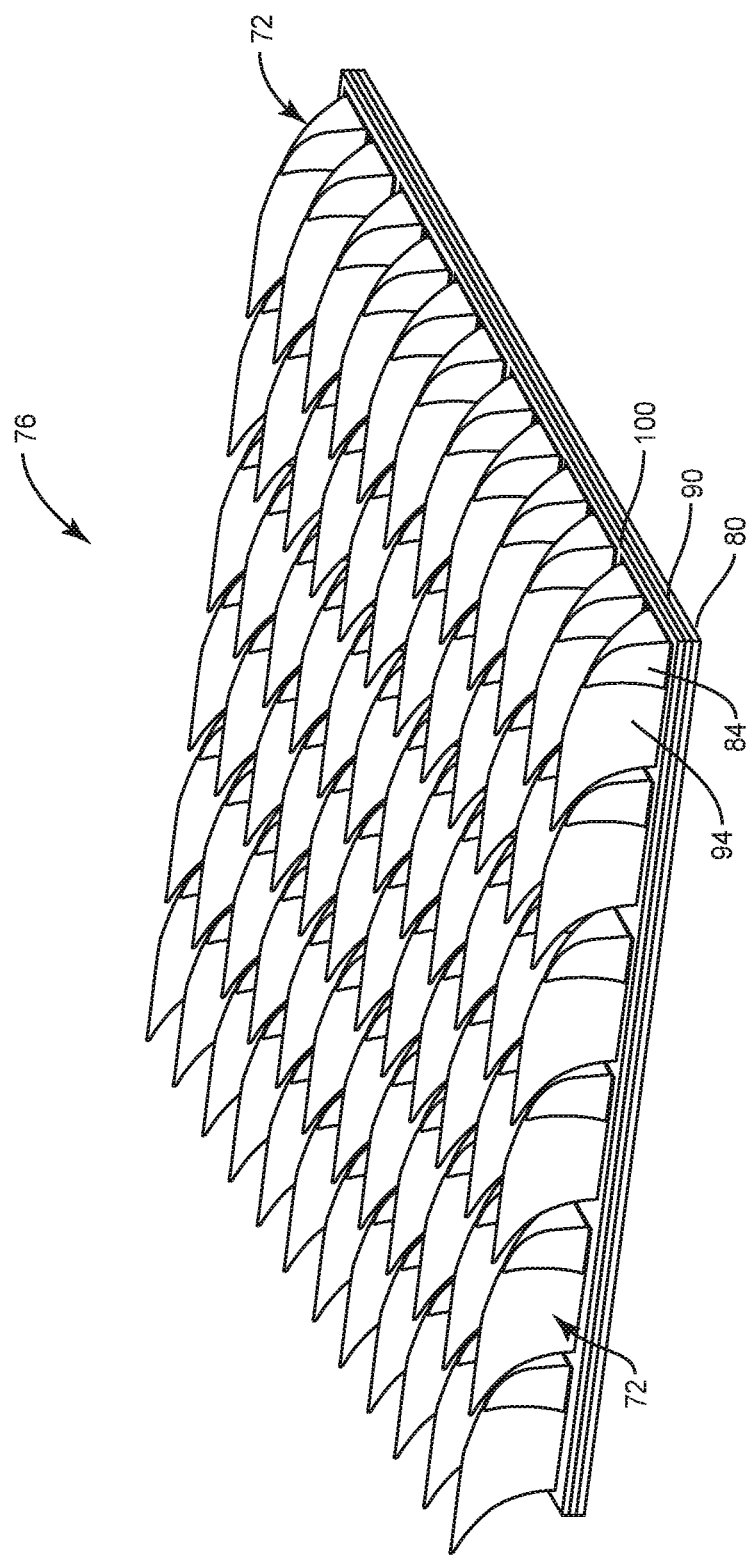

FIG. 14 shows a perspective view of a molding insert assembly of aspects of the present disclosure.

Figure 15:
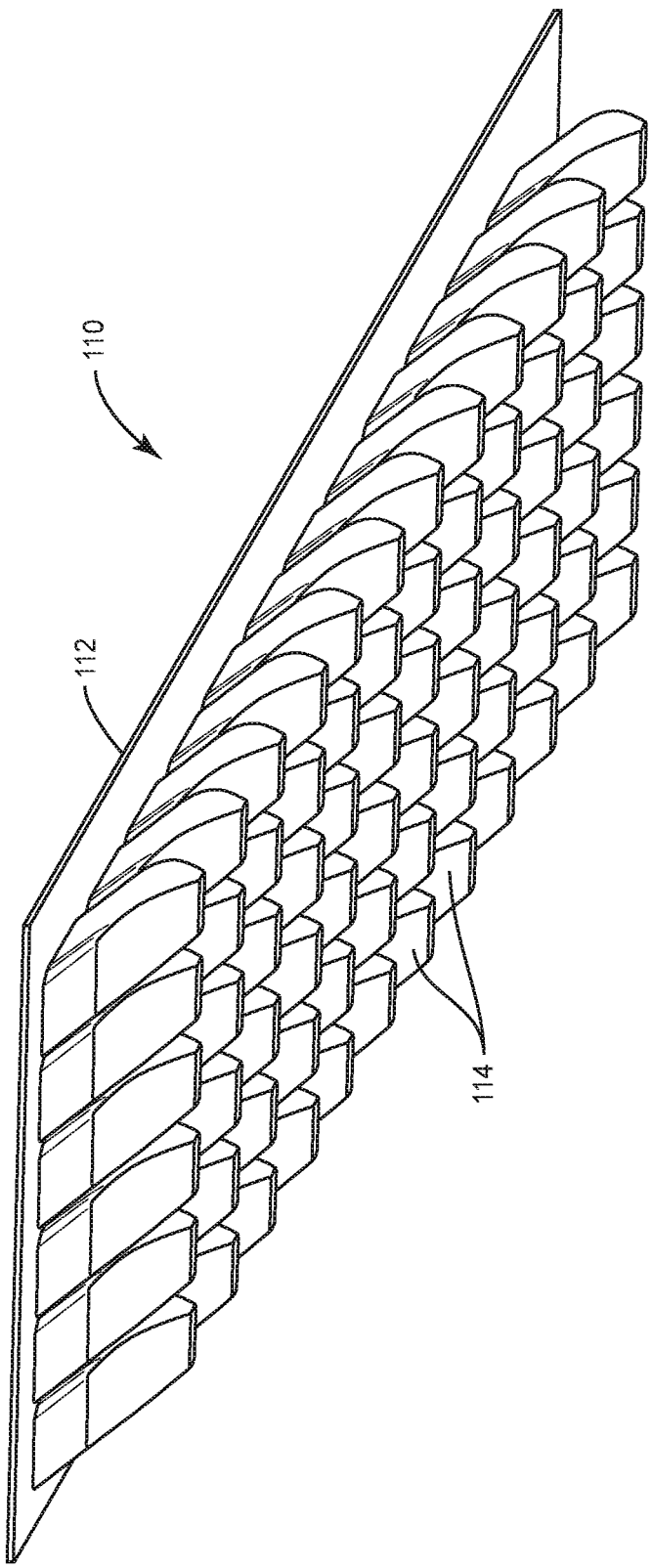

FIG. 15 shows an inverted perspective view of an upper mold insert of aspects of the present disclosure.

Figure 16:
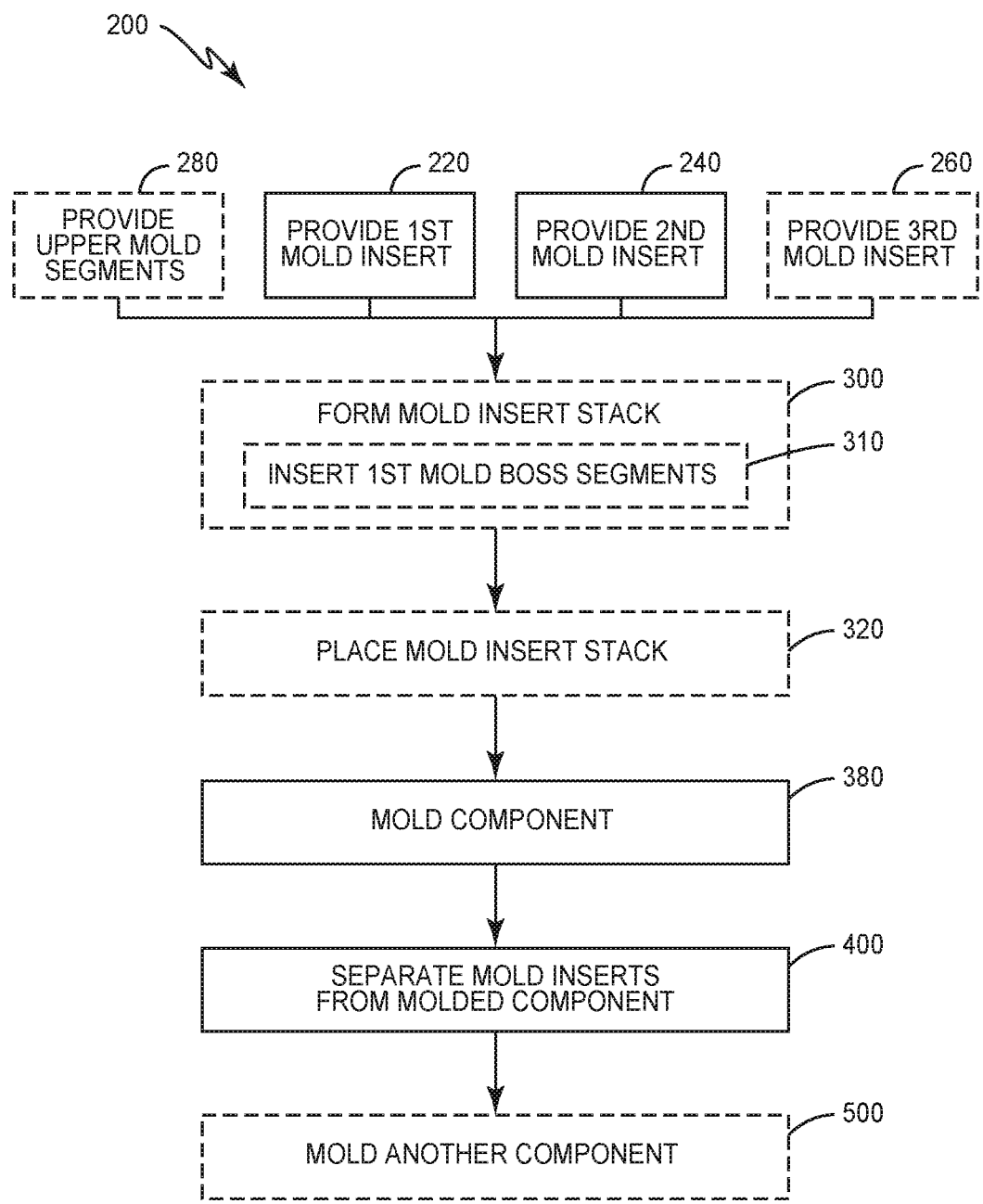

FIG. 16 shows a flowchart pertaining to aspects of the present disclosure.

Figure 17:
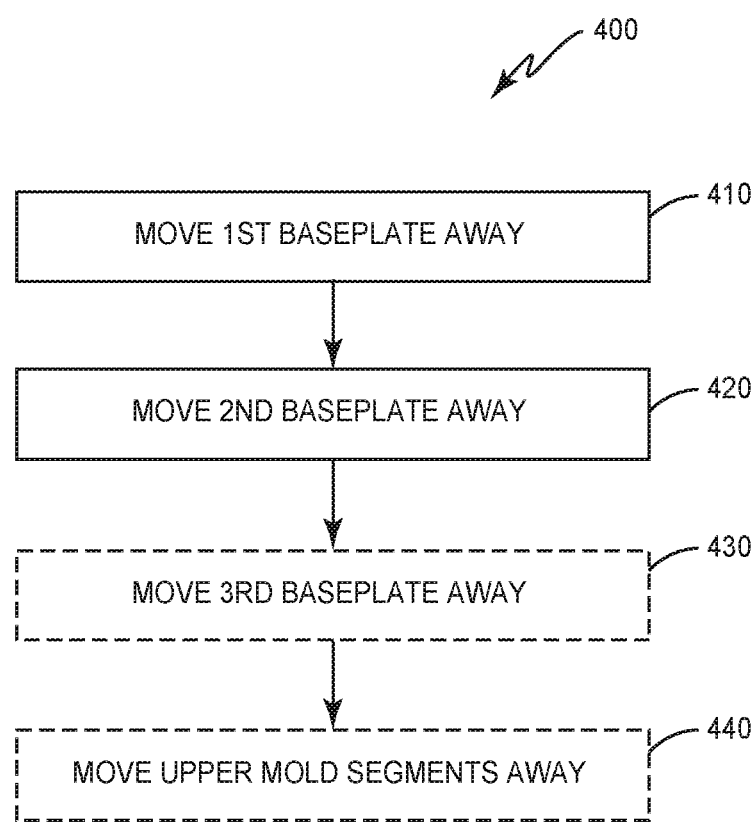

FIG. 17 shows a flowchart of a separating mold inserts from a molded component pertaining to aspects of the present disclosure.

Figure 18:
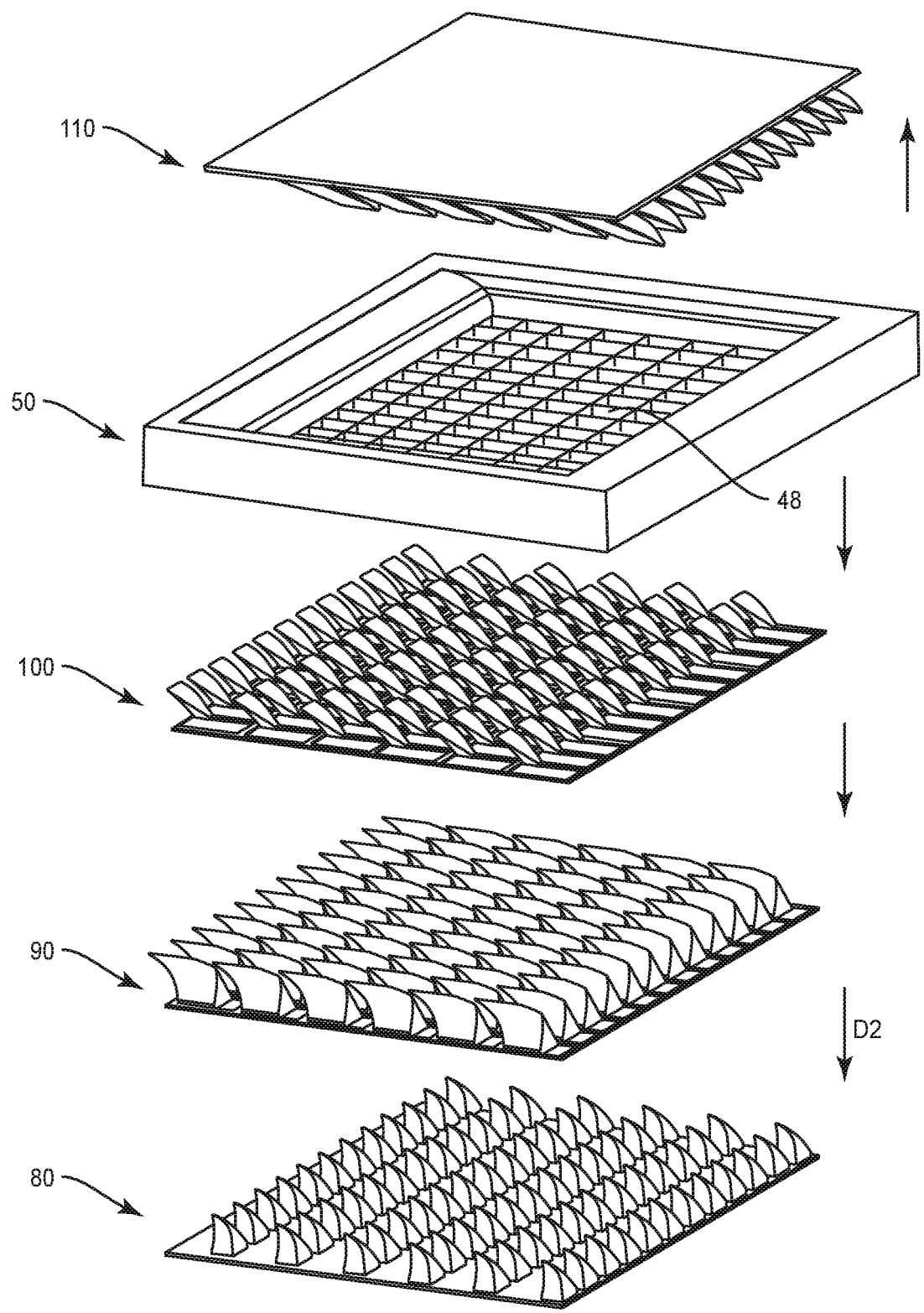

FIG. 18 shows a first mold insert, a second mold insert, and an optional third mold insert being separated from a molded component.

DETAILED DESCRIPTION

Aspects of the present disclosure provide an efficient means of fabricating components, such as by molding, that are advantageously employed to fabricate components having cavities with negative draft angles or other features that inhibit use of traditional techniques. Accordingly, aspects of the present disclosure are generally directed to a method of fabricating a component having a plurality of cavities extending through the component, with each cavity having at least one surface with a complex contour, and related devices. One illustrative example of such a component is a cascade grid panel for a jet engine thrust reverser. In some aspects, a plurality of two or more mold inserts are stacked to form a mold insert stack, with the mold insert stack having a plurality of mold bosses formed by mold boss sets. The mold boss sets are each formed by a mold boss segment from each of the mold inserts. Further, the mold boss segments are advantageously unitarily formed with their respective baseplates, or affixed (e.g., fastened, welded, glued, etc.) thereto, so that the mold boss segments can be handled as a group and remain properly positioned relative to their neighboring mold boss segments. Use of the mold boss segments attached to the baseplates allows for more efficient cleaning and handling of mold equipment, and simpler preparation for molding of additional components than with some other known molding arrangements.

In order to better facilitate understanding, a cascade grid panel will generally be used as an illustrative example of the component, and the discussion below starts with a brief review of a cascade grid panel. However, it should be understood that the present disclosure is not limited to cascade grid panels, but is instead applicable to a wide variety of components.

Referring first to FIGS. 1-3, an aircraft jet engine 20 includes a nacelle 22 and a transcowl that translates rearwardly to expose a cascade-type thrust reverser 26. Thrust reversers 26 are devices used to turn jet engine exhaust to a direction with a sufficient forward component to create a reverse thrust to enable aerodynamic braking during an aircraft landing maneuver. The thrust reverser 26 comprises a plurality of circumferentially arranged, thrust reversing cascade grid panels 28.

During normal flying operations, the transcowl 24 is in a closed, forward position, joining the transcowl 24 with the nacelle 22, and thereby covering the cascade grid panels 28. During landing, the transcowl 24 is moved from its closed position to its open, rearwardly extended position (shown in FIGS. 1-3) by means of actuator rods 30. Opening the transcowl 24 exposes the cascade grid panels 28 to the surrounding environment. With the transcowl 24 having been shifted to its open position, the thrust reverser 26 is activated by closing circumferentially located blocker doors 32. Closing the blocker doors 32 prevents the bypass exhaust from flowing in its normal direction out of the nozzle 34, forcing the exhaust through the cascade grid panels 28, as shown by the arrows 36 in FIG. 3. Each of the cascade grid panels 28 includes vanes 46 that direct the flow of the exhaust forward, and optionally radially outward, producing a reversal in the direction of the exhaust flow. This reversal of the exhaust flow results in a reversal of thrust that assists in slowing down the aircraft.

FIGS. 4-5 illustrate additional details of a cascade grid panel 28, along with a related coordinate system 25 showing the axial-forward direction, the radial-up direction and the side-circumferential direction. The cascade grid panel 28 is curved in the side-circumferential direction, and comprises a plurality of axially extending strongbacks 44, a plurality of vanes 46 extending between the strongbacks 44, and fore and aft mounting flanges 40, 42 respectively. The mounting flanges 40, 42 allow the cascade grid panels 28 to be mounted side-by-side in a circumferential arrangement around the nacelle 22.

The strongbacks 44, together with the vanes 46, form a plurality of cavities 48 through which the bypass air flows and is redirected. The direction of exhaust airflow is tailored by the direction of the surfaces of the cavities 48 formed by the strongbacks 44 and vanes 46. The cavities 48, as a result of having surfaces that direct exhaust air flow in varied directions, typically have at least one surface with a complex contour. As used herein, a complex contour is considered to be a surface having more than one geometric curvature extending in multiple dimensions. More specifically, the surface with the complex contour has a first contour on a first edge and second contour on a second edge.

The strongbacks 44 typically extend generally parallel to each other and are spaced apart in the side-circumferential direction. In some aspects, each of the strongbacks 44 is planar and is aligned with the radial-up direction, however in other aspects, the strongbacks 44 may be not planar and/or may be inclined a desired degree in order to direct the airflow in the side-circumferential direction. The vanes 46 are spaced apart from each other in the axial-forward direction and each may be inclined relative to the radial-up direction or be cup shaped (see FIG. 5). As shown in FIGS. 3 and 5, the vanes 46 define a surface 49 of the cavity that has a complex contour. In addition, the surface 49 has a negative draft angle θ, as discussed further below. In some aspects of the present disclosure, the peripheral surfaces of cavity 48 formed by the strongbacks 44 may also have a complex contour.

The cascade grid panel 28 shown in FIGS. 1-5 is an illustrative example of a component 50 that has a plurality of cavities 48 extending through the component, with each cavity 48 having at least one surface 49 with a complex contour. Cascade grid panels 28 may be formed by a variety of manufacturing methods, including molding. When fabricating a cascade grid panel 28 using molding, a molding apparatus is typically employed.

A molding apparatus 60 according to one or more aspects of the present disclosure is shown in FIG. 6. The molding apparatus 60 is configured to fabricate a component 50, the component 50 having a plurality of cavities 48, each cavity 48 having at least one surface 49 with a complex contour. The component 50 is formed by introducing material 10 into the molding apparatus 60. Material 10 may be any desirable material that may be shaped using a molding process. For example, the material 10 may be reinforced or unreinforced thermoplastic polymers, reinforced or unreinforced thermoset polymers, reinforced or unreinforced ceramic compounds, or any other desirable material that may be shaped using a molding process.

The molding apparatus 60 includes a mold cavity 62 formed by a first mold portion 64 and second mold portion 66 that are movable relative to each other. A mold insert assembly 70 is disposed within the mold cavity 62 for fabricating a component 50. The mold insert assembly 70 may be mounted to the first mold portion 64, or the second mold portion 66, or to both the first mold portion 64 and the second mold portion 66. The mold insert assembly 70, discussed further below, includes at least a first mold insert 80 and a second mold insert 90, and may include further mold inserts. The mold insert assembly 70 helps define a first forming surface 65, which in FIG. 6 is associated with the first mold portion 64. In addition, the molding apparatus 60 includes a second forming surface 67 associated with the second mold portion 66. In some aspects, the second forming surface 67 may be defined by an upper mold insert 110 of the mold insert assembly 70, discussed further below. The first and second mold portions 64, 66 are designed to be opened and closed, to open and close the mold cavity 62, by suitable actuation means (not shown), such as hydraulic rams and the like. In addition, in some aspects, the first and second mold portions 64, 66 include suitable heating and/or cooling means (not shown) for supplying or removing heat from the mold cavity 62.

Referring to FIGS. 7-11, the mold insert assembly 70 includes a first mold insert 80 and a second mold insert 90. In some aspects, mold insert assembly 70 optionally includes a third mold insert 100 and/or an upper mold insert 110. In addition, the mold insert assembly 70 may include any suitable number of mold further inserts, such as a fourth mold insert, a fifth mold insert (not shown), a sixth mold insert, etc. Thus, while the mold insert assembly 70 of FIGS. 7-7A includes a first mold insert 80, a second mold insert 90, a third mold insert 100, and an upper mold insert 110, it should be understood that the mold insert assembly 70, in some aspects, may not include the third mold insert 100 and/or an upper mold insert 110, or may include additional mold inserts. Further, while FIG. 7 illustrates four mold boss sets 72, with one mold boss set isolated in FIG. 7A, and different mold inserts are shown with different shading schemes, and an upper baseplate 112 of the optional upper mold insert 110 is shown in dashed lines, this is done to aid in understanding. In other illustrations, such as FIGS. 8-15, and FIG. 18, the mold insert assembly 70 is illustrated as having seventy-two mold bosses sets 72, corresponding to seventy-two cavities 48; but the mold insert assembly 70 can have any number of two or more mold boss sets 72, such as three, six, forty-eight, seventy-two, three hundred, etc. as is appropriate to achieve the desired component 50.

Referring to FIG. 8, the first mold insert 80 has a first baseplate 82 and a plurality of first mold boss segments 84 protruding from the first baseplate 82 in spaced relation to each other. The first mold boss segments 84 are advantageously unitarily formed with the first baseplate 82 and/or may be affixed thereto. In some aspects, the first mold boss segments 84 are arranged in rows and/or columns 88. In some aspects, the first baseplate 82 is planar. In some aspects, the first baseplate 82 is non-planar, such as by being curved in one or more directions (e.g., in a direction corresponding to the side-circumferential direction of the component 50).

Referring to FIG. 9, the second mold insert 90 has a second baseplate 92 and a plurality of second mold boss segments 94 protruding from the second baseplate 92 in spaced relation to each other. The second mold boss segments 94 are advantageously unitarily formed with the second baseplate 92 and/or may be affixed thereto. In some aspects, the second mold boss segments 94 are arranged in rows and/or columns 98. The second mold insert 90 further has a plurality of second apertures 96 in the second baseplate 92 disposed in spaced relation to each other. The second apertures 96 are located and sized so that the first mold boss segments 84 of the first mold insert 80 may extend through corresponding second apertures 96 when the first and second mold inserts 80, 90 are stacked. In some aspects, the second baseplate 92 is planar. In some aspects, the second baseplate 92 is non-planar, such as by being curved in one or more directions (e.g., in a direction corresponding to the side-circumferential direction of the component 50).

Referring to FIGS. 10-11, the first and second mold inserts 80, 90 are configured to be stacked such that the second baseplate 92 overlaps the first baseplate 82 and each of the first mold boss segments 84 extends through a corresponding second aperture 96 and abuts a corresponding second mold boss segment 94. For example, the first mold boss segments 84 may be inserted, as indicated by arrow D1 in FIG. 10, through the second apertures 96, and the first baseplate 82 brought into contact with the second baseplate 92, to form a mold insert stack 76 as shown in FIG. 11. When stacked, the first and second mold inserts 80, 90 jointly form mold boss sets 72, with each mold boss set 72 comprising a first mold boss segment 84 and an abutting second mold boss segment 94. Each mold boss set 72 forms a cavity-fill structure configured to at least partly fill a corresponding cavity 48 of the plurality of cavities 48 of the component 50. The first and second mold boss segments 84, 94 are configured to create the first forming surface 65 with a complex contour corresponding to the surface 49 of the corresponding cavity 48. In addition, the first and second mold boss segments 84, 94 are configured to be removable from their corresponding cavities 48, after molding of the component 50, while remaining retained with their respective baseplates 82, 92.

As mentioned above, in some aspects, the mold insert assembly 70 includes a third mold insert 100. Referring to FIG. 12, similar to the first and second mold inserts 80, 90, the third mold insert 100 has a third baseplate 102 and a plurality of third mold boss segments 104 protruding from the third baseplate 102 in spaced relation to each other. The third mold boss segments 104 are advantageously unitarily formed with the third baseplate 102 and/or may be affixed thereto. And, similar to the second mold insert 90, the third mold insert 100 has a plurality of third apertures 106 in the third baseplate 102 disposed in spaced relation to each other. The third apertures 106 are located and sized so that the first and second mold boss segments 84, 94 of the first and second mold inserts 80, 90, respectively, may extend through corresponding third apertures 106 when the first, second, and third mold inserts 80, 90, 100 are stacked. In some aspects, the third baseplate 102 is planar. In some aspects, the third baseplate 102 is non-planar, such as by being curved in one or more directions (e.g., in a direction corresponding to the side-circumferential direction of the component 50).

When the first, second, and third mold inserts 80, 90, 100 are stacked, the third baseplate 102 overlaps the second baseplate 92 such that the second baseplate 92 is sandwiched between the first baseplate 82 and the third baseplate 102, the first and second mold boss segments 84, 94 extend through corresponding ones of the third apertures 106, and each mold boss set 72 includes a third mold boss segment 104 that abuts either or both of the first mold boss segment 84 and the second mold boss segment 94 of that mold boss set 72. The first and second mold boss segments 84, 94 may be inserted, as indicated by arrow D1 in FIG. 13, through the third apertures 106 and the second baseplate 92 brought into contact with the third baseplate 102, to form a mold insert stack 76 as shown in FIG. 14. It should be noted that in some aspects, the first baseplate 82, the second baseplate 92, and/or the third baseplate 102 have the same footprint and overall contours so as to facilitate stacking with each other.

As mentioned above, in some aspects, the mold insert assembly 70 includes an upper mold insert 110. Referring to FIG. 15, the upper mold insert includes a plurality of upper mold boss segments 114, and optionally includes an upper baseplate 112. When the upper mold insert is present, the upper mold insert 110 is disposed closer to the second baseplate 92 than the first baseplate 82, such as by being disposed above the second baseplate 92, while the first baseplate 82 is below the second baseplate 92. Or, if an optional third mold insert 100 is also present, the upper mold insert 110 is disposed above the third baseplate 102, while the first and second baseplate 82, 92 are disposed below the third baseplate 102. The upper mold boss segments 114 extend downward toward the second baseplate 92. Thus, in some aspects, each mold boss set 72 further includes an upper mold boss segment 114 from the upper mold insert 110. Thus each mold boss set 72 in such aspects is advantageously configured to fully fill a corresponding cavity 48 of the plurality of cavities 48 of the component 50.

In other aspects, the upper mold boss segments 114 are not formed by an upper mold insert 110, but are formed integral with the second mold portion 66. In other aspects, there are no upper mold boss segments 114.

Some or all of the various elements described herein may be used in a method (or process) 200 to fabricate a component 50, where the component 50 has a plurality of cavities 48 extending through the component 50, with each cavity 48 having at least one surface 49 with a complex contour. One or more suitable methods of fabricating the component 50 are shown in FIG. 16. In FIG. 16, dashing is used to indicate optional events. The process 200 of FIG. 16 includes providing 220 a first mold insert 80. As described above, the first mold insert 80 has a first baseplate 82 and a plurality of first mold boss segments 84 protruding from the first baseplate 82 in spaced relation to each other. The process 200 also includes providing 240 a second mold insert 90 having a second baseplate 92 and a plurality of second mold boss segments 94 protruding from the second baseplate 92 in spaced relation to each other. The process 200 includes molding 380 the component 50 while each cavity 48 of the plurality of cavities 48 is at least partly filled by both a first mold boss segment 84 from the first mold insert 80 and a second mold boss segment from the second mold insert 90, and while the first and second mold inserts 80, 90 are stacked such that the second baseplate 92 overlaps the first baseplate 82 with the first mold boss segments 84 from the first mold insert 80 extending through the second baseplate 92 of the second mold insert 90. The process 200 includes, thereafter separating 400 the first and second mold inserts 80, 90 from the molded component 50 while retaining the mold boss segments 84, 94 of the first and second mold inserts 80, 90 with their respective baseplates 82, 92. Regarding the component 50 that is molded, each cavity 48 of the plurality of cavities 48 has at least one negative draft angle $\theta$ with respect to the first and second baseplates 82, 92.

In some aspects, the process 200 includes, prior to the molding 380, forming 300 a mold insert stack 76 by stacking the first and second mold inserts 80, 90, and placing 320 the mold insert stack 76 in a first mold portion 64. In other aspects, the second mold insert 90 is placed in the first mold portion 64, and the first mold insert 80 is subsequently added to the first mold portion 64 so as to stack the first and second mold inserts 80, 90. Other mold inserts (e.g., third mold insert 100, discussed below) are optionally stacked with the first and second mold inserts 80, 90 in a similar manner. In some aspects, as indicated above, the second mold insert 90 includes a plurality of second apertures 96 through the second baseplate 92, and the stacking includes inserting 310 the first mold boss segments 84 through the second apertures 96. In some aspects, during the molding the component 50, each of the first mold boss segments 84 extend through corresponding ones of the second apertures 96 and abuts a corresponding second mold boss segment 94.

The discussion above has generally been in the context of the mold insert stack 76, formed by the first and second mold inserts 80, 90, being disposed in the first mold portion 64, so as to form at least part of the forming surface 65 of the first mold portion 64, with the first mold portion 64 being disposed vertically below the second mold portion 66. As such, the first baseplate 82 of the first mold insert 80 is disposed vertically below the second baseplate 92 of the second mold insert 90. However, in some aspects of the disclosure, the mold insert stack 76 is alternatively disposed in the second mold portion 66, such that the mold insert stack 76 forms at least part of second forming surface 67 and first baseplate 82 of the first mold insert 80 is disposed vertically above the second baseplate 92 of the second mold insert 90. And, in some aspects of the disclosure, the first and second mold portions 64, 66 are alternatively disposed (and move) laterally rather than vertically, such that the first baseplate 82 of the first mold insert 80 is disposed to the left or right of the second baseplate 92 of the second mold insert 90.

In some aspects, the process 200 optionally includes providing 260 a third mold insert 100 having a third baseplate 102 and a plurality of third mold boss segments 104 protruding from the third baseplate 102 in spaced relation to each other. For such aspects, the step of molding 380 the component 50 includes molding the component 50 while the first, second, and third mold inserts 80, 90, 100 are stacked such that the third baseplate 102 overlaps the first and second baseplates 82, 92 with the first and second mold boss segments 84, 94 from the first and second mold inserts 80, 90, respectively, extending through the third baseplate 102 of the third mold insert 100, advantageously by extending through corresponding third apertures 106 in the third baseplate 102. And, for such aspects, the step of separating 400 the mold inserts 80, 90, 100 from the molded component 50 includes separating the mold inserts 80, 90, 100 from the molded component 50 while retaining the third mold boss segments 104 with the third baseplate 102.

In some aspects with the third mold insert 100, the first mold boss segments 84 extend upward away from the first baseplate 82, and the process 200 includes providing a plurality of upper mold boss segments 114 extending downward toward the first baseplate 82. For such aspects, the process 200 optionally includes molding the component 50 while a respective upper mold boss segment 114 extends into each cavity 48 of the plurality of cavities 48, and each cavity 48 of the plurality of cavities 48 is jointly filled by a corresponding first, second, third, and upper mold boss segment 84, 94, 104, 114.

Referring to FIGS. 17-18, in some aspects, the step of separating 400 the mold inserts 80, 90 from the molded component 50 includes sequentially separating the first mold insert 80 and the second mold insert 90 by moving 410 the first baseplate 82 away from the molded component 50, such as in direction D2, while retaining the first mold boss segments 84 with the first baseplate 82; and thereafter, moving 420 the second baseplate 92 away from the molded component 50 while retaining the second mold boss segments 94 with the second baseplate 92. Note that the first and second baseplates 82, 92 may be moved in the same direction (e.g., direction D2), or in differing directions when being moved away from the molded component 50. For example, the first baseplate 82 may be moved down (in direction D2) and optionally forward relative to the molded component 50, and the second baseplate 92 may be moved down and rotated in a side-circumferential direction, when being moved away from the molded component 50 during the separating 400. And, if a third baseplate 102 is used, the separating 400 advantageously includes moving 430 the third baseplate 102 away from the molded component 50. And, where upper mold segments 114 are employed, the separating 400 advantageously includes moving 440 the upper mold segments 114 (and upper mold insert 110 if present) away from the molded component 50, such as in a direction opposite direction D2.

In some aspects, the process 200 advantageously includes, after the separating, fabricating 500 another component 52 using both the first mold insert 80 and the second mold insert 90, while retaining the mold boss segments 84, 94 of the first and second mold inserts 80, 90 with their respective baseplates 82, 92. Use of the first and second mold boss segments 84, 94 attached to the first and second baseplates 82, 92, respectively, allows for more efficient cleaning and handling of mold equipment, and simpler preparation for molding of additional components (e.g., another component 52) than with some other known molding arrangements. Note that the fabricating 500 of the another component 52 may optionally include using the third mold insert 100 and/or the upper mold insert 110, as well as the first and second mold inserts 80, 90.

In some aspects, the molded component 50 is a cascade grid panel 28 for a jet engine thrust reverser. In some aspects, the molding apparatus 60 is configured to sequentially mold multiple cascade grid panels 28 for a jet engine thrust reverser using the same mold inserts 80, 90, while retaining the mold boss segments 84, 94 of the first and second mold inserts 80, 90 with their respective baseplates 82, 92. Thus, in some aspects, the process 200 may continue with molding of another component 52, such as a cascade grid panel 28, using the same first and second mold inserts 80, 90, and optionally the same third mold insert 100, etc.

In some aspects, the process 200 is a compression molding process, such that the process includes compression molding the component 50 while each cavity 48 of the plurality of cavities 48 is at least partly filled by both a first mold boss segment 84 from the first mold insert 80 and a second mold boss segment 94 from the second mold insert 90. In some aspects, the process 200 is an injection molding process.

As can be appreciated, aspects of the present disclosure are increasingly advantageous as the number of cavities 48 increases. Thus, aspects of the present disclosure are particularly advantageous for components 50 having six or more cavities 48, but are also advantageous for components 50 having two or more cavities 48.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method of fabricating a component, the component having a plurality of cavities extending through the component, each cavity having at least one surface with a complex contour, the method comprising:
provinding a first mold insert having a first baseplate and a plurality of first mold boss segments protruding from the first baseplate in spaced relation to each other;
providing a second mold insert having a second baseplate and a plurality of second mold boss segments protruding from the second baseplate in spaced relation to each other;
molding the component while each cavity of the plurality of cavities is at least partly filled by both a first mold boss segment from the first mold insert and a second mold boss segment from the second mold insert, and while the first and second mold inserts are stacked such that the second baseplate overlaps the first baseplate with the first mold boss segments from the first mold insert extending through the second baseplate of the second mold insert;
thereafter, separating the first and second mold inserts from the molded component while retaining the mold boss segments of the first and second mold inserts with their respective baseplates; and
wherein each cavity of the plurality of cavities has at least one surface with a negative draft angle ($\theta$) with respect to the first and second baseplates.

2. The method of claim 1:
further comprising providing a third mold insert having a third baseplate and a plurality of third mold boss segments protruding from the third baseplate in spaced relation to each other;
wherein the molding the component comprises molding the component while the first, second, and third mold inserts are stacked such that the third baseplate overlaps the first and second baseplates with the first and second mold boss segments from the first and second mold inserts, respectively, extend through the third baseplate of the third mold insert; and
wherein the separating the mold inserts from the molded component comprises separating the mold inserts from the molded component while retaining the third mold boss segments with the third baseplate.

3. The method of claim 2:
wherein the first mold boss segments extend upward away from the first baseplate;
further comprising providing a plurality of upper mold boss segments extending downward toward the first baseplate;
wherein the molding the component comprises molding the component while:
a respective upper mold boss extends into each cavity of the plurality of cavities; and
each cavity of the plurality of cavities is jointly filled by a corresponding first, second, third, and upper mold boss segment.

4. The method of claim 1:
further comprising, after the separating, fabricating another component using both the first mold insert and the second mold insert, while retaining the mold boss segments of the first and second mold inserts with their respective baseplates.

5. The method of claim 1, wherein the separating the mold inserts from the molded component comprises sequentially separating the first mold insert and the second mold insert by:
moving the first baseplate away from the molded component while retaining the first mold boss segments with the first baseplate; and thereafter, moving the second baseplate away from the molded component while retaining the second mold boss segments with the second baseplate.

6. The method of claim 1:
wherein the second mold insert further comprises a plurality of second apertures in the second baseplate disposed in spaced relation to each other; and
wherein, during the molding the component, each of the first mold boss segments extend through corresponding ones of the second apertures and abuts a corresponding second mold boss segment.

7. The method of claim 1, further comprising, prior to the molding:
forming a mold insert stack by stacking the first and second mold inserts; and
placing the mold insert stack in a first mold portion.

8. The method of claim 7:
wherein the second mold insert further comprises a plurality of second apertures through the second baseplate; and
wherein the stacking comprises inserting the first mold boss segments through the second apertures.

9. The method of claim 1, wherein the component is a cascade grid panel for a jet engine thrust reverser.

10. The method of claim 1, wherein, during the molding, the first baseplate is disposed vertically below the second baseplate.

11. A mold insert assembly for fabricating a component, the component having a plurality of cavities, each cavity having at least one surface with a complex contour, the mold insert assembly comprising:
a first mold insert having a first baseplate and a plurality of first mold boss segments protruding from the first baseplate in spaced relation to each other;
a second mold insert having a second baseplate and a plurality of second mold boss segments protruding from the second baseplate in spaced relation to each other; the second mold insert further having a plurality of second apertures in the second baseplate disposed in spaced relation to each other;
wherein the first and second mold inserts are stacked such that the second baseplate overlaps the first baseplate and each of the first mold boss segments extends through a corresponding second aperture and abuts a corresponding second mold boss segment;
wherein the first and second mold inserts jointly form mold boss sets, wherein each mold boss set comprises a first mold boss segment and the abutting second mold boss segment; wherein each mold boss set forms a cavity-fill structure configured to at least partly fill a corresponding cavity of the plurality of cavities of the component;
wherein the first and second mold boss segments are configured to be removable from their corresponding cavities, after molding of the component, while remaining retained with their respective baseplates.

12. The mold insert assembly of claim 11:
further comprising a third mold insert having a third baseplate and a plurality of third mold boss segments protruding from the third baseplate in spaced relation to each other; the third mold insert further having a plurality of third apertures in the third baseplate disposed in spaced relation to each other;
wherein the first, second, and third mold inserts are stacked such that the third baseplate overlaps the second baseplate such that the second baseplate is sandwiched between the first baseplate and the third baseplate;
wherein each of the first and second mold boss segments extend through corresponding ones of the third apertures;
wherein each mold boss set further comprises a third mold boss segment that abuts either or both of the first mold boss segment and the second mold boss segment of that mold boss set.

13. The mold insert assembly of claim 11, wherein the first and second baseplates are non-planar.

14. The mold insert assembly of claim 11, wherein the first mold boss segments are arranged in columns.

15. The mold insert assembly of claim 11:
further comprising an upper mold insert disposed closer to the second baseplate than the first baseplate, the upper mold insert comprising a plurality of upper mold boss segments that extend downward toward the second baseplate;
wherein each mold boss set further comprises an upper mold boss segment from the upper mold insert;
wherein each mold boss set is configured to fully fill a corresponding cavity of the plurality of cavities of the component.

16. A molding apparatus for fabricating a component, the component having a plurality of cavities, each cavity having at least one surface with a complex contour, the molding apparatus comprising:
a mold cavity formed by a first mold portion and a second mold portion that are movable relative to each other;
a mold insert assembly disposed within the mold cavity and comprising a first mold insert and a second mold insert;
wherein the first mold insert has a first baseplate and a plurality of first mold boss segments protruding from the first baseplate in spaced relation to each other;
wherein the second mold insert has a second baseplate and a plurality of second mold boss segments protruding from the second baseplate in spaced relation to each other; the second mold insert further having a plurality of second apertures in the second baseplate disposed in spaced relation to each other;
wherein the first and second mold inserts are stacked such that the second baseplate overlaps the first baseplate and each of the first mold boss segments extends through a corresponding second aperture and abuts a corresponding second mold boss segment;
wherein the first and second mold inserts jointly form mold boss sets, wherein each mold boss set comprises a first mold boss segment and the abutting second mold boss segment; wherein each mold boss set forms a cavity-fill structure configured to at least partly fill a corresponding cavity of the plurality of cavities of the component;
wherein the first and second mold boss segments are configured to be removable from their corresponding cavities, after molding of the component, while remaining retained with their respective baseplates.

17. The molding apparatus of claim 16:
wherein the mold insert assembly further comprises a third mold insert having a third baseplate and a plurality of third mold boss segments protruding from the third baseplate in spaced relation to each other; the third mold insert further having a plurality of third apertures in the third baseplate disposed in spaced relation to each other;
wherein first, second, and third mold inserts are stacked such that the third baseplate overlaps the second baseplate such that the second baseplate is sandwiched between the first baseplate and the third baseplate;
wherein each of the first and second mold boss segments extend through corresponding ones of the third apertures;
wherein each mold boss set further comprises a third mold boss segment that abuts either or both of the first mold boss segment and the second mold boss segment of that mold boss set.

18. The molding apparatus of claim 16, wherein the first and second baseplates are curved.

19. The molding apparatus of claim 16, wherein the first mold boss segments are arranged in columns.

20. The molding apparatus of claim 16, wherein the molding apparatus is configured to sequentially mold multiple cascade grid panels for a jet engine thrust reverser using the same mold inserts while retaining the mold boss segments of the first and second mold inserts with their respective baseplates.

* * * * *